United States Patent [19]

Laing

[11] 3,780,356

[45] Dec. 18, 1973

[54] COOLING DEVICE FOR SEMICONDUCTOR COMPONENTS

[76] Inventor: Nikolaus Laing, Hofener Weg, 35-37 7141 Aldingen near Stuttgart, Germany

[22] Filed: May 10, 1972

[21] Appl. No.: 252,081

Related U.S. Application Data

[63] Continuation of Ser. No. 6,273, Jan. 27, 1970, abandoned.

[30] Foreign Application Priority Data

Feb. 3, 1969 Austria .............................. 1961691

[52] U.S. Cl. ..... 317/234 R, 317/234 A, 317/234 B, 317/101 C, 174/15, 165/80, 165/105

[51] Int. Cl. ............................ H011 3/00, H011 5/00

[58] Field of Search ......................... 317/234, 1, 1.5, 317/4, 100, 101; 174/15; 165/80, 105

[56] References Cited

UNITED STATES PATENTS

| | | | |
|---|---|---|---|
| 2,903,629 | 9/1959 | Walker | 317/234 |
| 3,271,638 | 9/1966 | Murad | 317/234 |
| 3,328,642 | 6/1967 | Haumesser et al. | 317/100 |
| 3,400,543 | 9/1968 | Ross | 317/234 B |
| 3,476,175 | 11/1969 | Dlevyak | 317/234 B |
| 3,673,306 | 6/1972 | Kirkpatrick | 317/234 B |

FOREIGN PATENTS OR APPLICATIONS

| | | | |
|---|---|---|---|
| 785,461 | 10/1957 | Great Britain | 317/234 A |
| 914,034 | 12/1962 | Great Britain | 317/234 B |
| 958,140 | 2/1957 | Germany | 165/80 |
| 1,041,600 | 10/1958 | Germany | 317/234 A |

OTHER PUBLICATIONS

IBM Technical Disclosure Bulletin; by Seely, Vol. 11, No. 7, December, 1968, pages 838-839.

The Heat Pipe; by Thomas Feldman; Mechanical Engineering; pages 30 to 33, February, 1967.

*Primary Examiner*—John W. Huckert
*Assistant Examiner*—Andrew J. James
*Attorney*—Dean S. Edmonds et al.

[57] ABSTRACT

A device for cooling a semiconductor component comprising a chamber enclosing a non-metallic crystal forming material which experiences a phase change at a temperature which corresponds to the desired operating temperature of the semiconductor component and wherein the material is in thermal communication with the semiconductor component.

9 Claims, 7 Drawing Figures

COOLING DEVICE FOR SEMICONDUCTOR COMPONENTS

REFERENCE TO OTHER APPLICATIONS

This application is a continuation of my copending application Ser. No. 6,273, filed Jan. 27, 1970 and now abandoned.

DESCRIPTION OF THE PRIOR ART

Semiconductor elements, such as diodes, transistors, thyristors, etc. exert a directional resistance on an electric current so that when current passes through a semiconductor element, heat is liberated and the semiconductor element rapidly heats up in operation. At higher loss rates, e.g. at loss rates in excess of 1 Watt, the heat liberated leads to excessive heating of the semiconductor element. In such cases a semiconductor component has often been combined with cooling devices, as for example, cooling bodies. Cooling bodies are usually made of a metal with a relatively large surface and the bodies are arranged in heat conductive communication with the semiconductor component such that the bodies serve as heat sinks.

Furthermore cooling devices for semiconductors which utilize vapor cooling have been proposed. In such cases a liquid coolant is, in operation, evaporated by the heat loss given off by a semiconductor and the vapor formed is re-condensed by heat dissipation to the environment whereby the condensate can again absorb heat from the semiconductor element by evaporation. See for example the disclosures of U.S. Pats. No. 3,476,175, British specification Pat. No. 1,109,597 and *The Heat Pipe* by K. Thomas Feldman, Jr. appearing in *Mechanical Engineering* February, 1967, Pages 31–33.

In a further known cooling device for semiconductor components, the component is surrounded by a cavity containing a metal which melts below the maximum permissible operating temperature of the semiconductor component. This form of cooling has not proved successful since the heat capacity of low melting point metals is very small (in the metals used in the known cooling device, it is 6 cal/g for bismuth indium, 5.5 cal/g for bismuth-lead-tin, and 4 cal/g for caesium) while the thermal conductivity is very great so that the semiconductor component, which is in heat conductive communication with the meltable part, reaches its optimum operating temperature only when the entire mass of metal has been heated to a temperature close to its melting point. During the time in which the cooling metal absorbs sensible heat, the temperature of the semiconductor component rises relatively slowly so that its resistance is continuously changing. This behavior is particularly disadvantageous where the semiconductor component is used in electronic apparatus which is switched on for relatively short periods at frequent intervals. Here it is important that the semiconductor component should rapidly reach and maintain its optimum or desired operating temperature.

The disadvantage of slow heating up of a semiconductor or component by absorption of sensible heat through a cooling device is also possessed by the above-mentioned vapor cooling and body cooling devices so that in practice these devices are suitable only for continuous operation of semiconductors. Moreover vapor cooled semiconductor devices have to be of very large dimension while water-cooled devices are very expensive to manufacture.

SUMMARY OF THE INVENTION

The purpose of the invention is to provide a cooling device for a semiconductor component which, on the one hand, makes it possible for the semiconductor component in operation to reach its optimum operating temperature rapidly, and on the other hand, to provide a large heat capacity at the optimum operating temperature.

The invention solves this problem in that the cooling device includes a non-metallic substance having a thermal conductivity less than that of a metal which forms crystals, the linkage forces of which are predominantly ion linkages or van der Waal linkages and where the substance experiences a phase change at a temperature which practically coincides with the optimum operating temperature of the semiconductor.

DETAILED DESCRIPTION OF THE INVENTION

Figure 1:
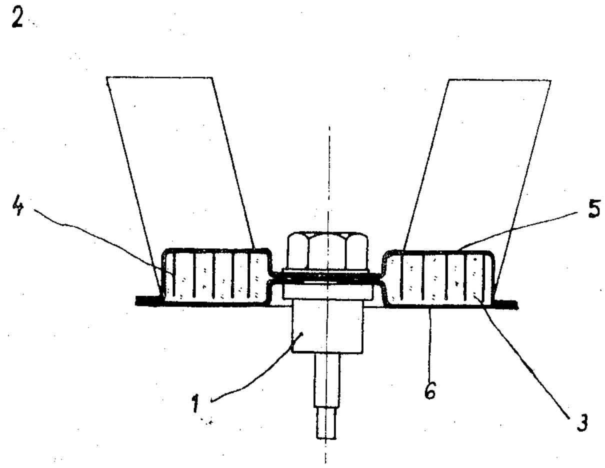
FIG. 1 is a side partial sectional view of a diode cooled by a device according to the invention.
Figure 2:
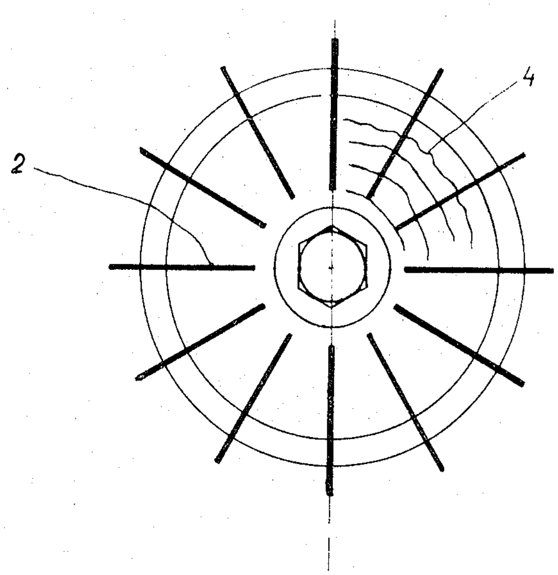
FIG. 2 is a partial top view of the diode of FIG. 1.

Referring to FIG. 1 there is illustrated a semiconductor diode 1 having a cooling device according to the invention wherein the device comprises two annular cups 5 and 6 which together form a hermetically sealed chamber 3 which is filled with a cooling substance, e.g. Mg $(NO_3)_2{\cdot}6H_2O$. Spirally developed ribs 4 are included in the chamber 3 to facilitate heat transfer conditions between the cup 5 and the storage substance. Fins 2 are provided to increase the heat transfer surface between the cooling device and surrounding ambient air.

The cooling substances that may be used are advantageously materials which form ion crystals and the cations of which contain an alkali metal, alkali earth metal and/or the ammonia group, and the phase change enthalpy of which at the optimum operating temperature of the semiconductor component exceeds 40 cal/g. Examples of such materials are $MgO1_2{\cdot}6H_2O$, $A1(HN_4)_2{\cdot}(SO_4)_4{\cdot}24H_2O$ and $Mg(NO_3)_2{\cdot}6H_2O$.

Because of the low thermal conductivity of these materials, the semiconductor component which is in heat conductive communication with these materials, must initially be regarded as substantially thermally insulated. Also because of the small mass of the semiconductor, it will heat up quickly to substantially its optimum operating temperature. This operating temperature in accordance with the invention, coincides with the phase change temperature of the ion crystal forming material so that the layer of the material which is directly adjacent the semiconductor component is melted or undergoes a phase change when the semiconductor component has reached its optimum operating temperature while those layers which are further removed from the semiconductor component will remain substantially at ambient temperature. The acquisition of sensible heat by the material proceeds slowly because latent heat necessary to cause a phase change in the material is absorbed in the regions in the vicinity of the semiconductor element, leaving only a small heat supply in the form of sensible heat to slowly heat the remainder of the cooling material up to the temperature of change whereby the entire cooling material undergoes a crystal change or is melted layer by layer.

When the cooling material melts in the course of its phase change, convection currents may occur depending on the mass of the material and the viscosity of the melt. As this results in undesirable premature removal of heat, the cooling material may, in accordance with the invention, be provided with a thickener, e.g. silicon dioxide crystals or magnesium dioxide crystals, so that any heat transfer through convection is prevented. At the same time the thickener prevents the discharge of corrosive liquids from the chamber in the event of damage to the cooling device.

Suitable cooling materials for use with germanium based semiconductors are hydrates of the inorganic salts of alkali or alkali earth metals, and also the eutectics of the chlorides, nitrates, acetates or ammoniates of the light metals. In accordance with the invention, apart from the enthalpy of melting, the enthalpy of change between two crystalline polymorphous phases of materials may also be used.

The invention also envisages the use of the enthalpy of a polymorphous phase change for cooling, and the enthalpy of melting as a protection against the destruction of a semiconductor component. Thus, for example, $NH_4NO_3$ has a polymorphous point of change at 125°. This temperature coincides with the optimum operating temperature of nearly all silicon semiconductor components. At 170° this salt melts and as it absorbs further latent heat, it protects the semiconductor element from destruction.

Figures 3, 4:
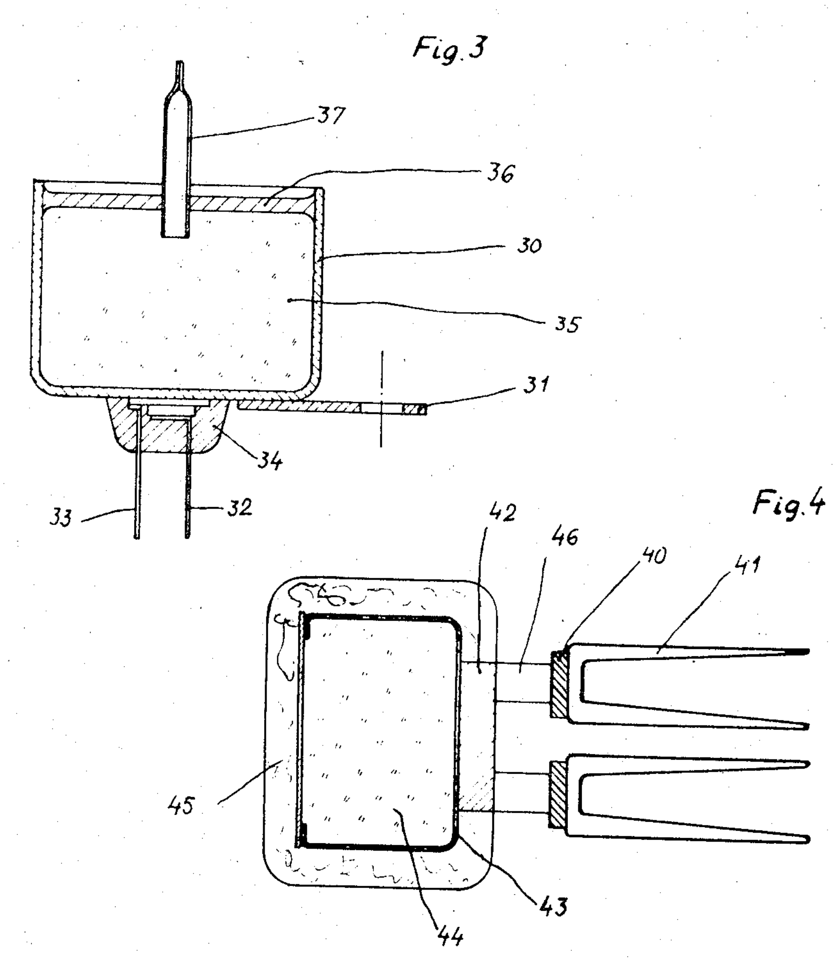
FIG. 3 is a side sectional view of a triode cooled by a device according to the invention.
FIG. 4 is a side sectional view of a semiconductor in the form of a Peltier element cooled by a device according to the invention.

FIG. 3 shows a triode in which a storage housing 30 forms an electrode which is connected with a support element in electrically conducting manner by the lug 31, while the remaining poles 32 and 33 protrude from a plastic body 34. The interior of the housing 30 is filled with a cooling material 35. A cover 36 for the housing has a tube 37 extending therethrough where the tube is filled with the cooling material 35. One end of the tube is in communication with the chamber within the housing while the other end is outside the housing. The material in the end of the tube outside of the housing never melts so that the crystals of the material act as seed crystals and induce the isomorphous innoculation of the cooling material. In addition to cooling semiconductors used for rectification or amplification, cooling devices according to the invention are also applicable for use with semiconductors in the form of Peltier elements. If, for example, it is desired to keep semiconductor amplifiers at a constant temperature, i.e. room temperature, the semiconductor may be put in heat conducting communication with the cold side of a Peltier element while the hot side of the Peltier element is put into a heat conducting communication with a cooling material of the form described previously. Referring to FIG. 4, there is illustrated a semiconductor component in the form of a Peltier element, the first side 40 of which comprises a heat absorbant electrode having heat conducting elements 41 which may cool or heat the surrounding space or separate elements. The second side 42 comprises a heat emitting element which is in good thermal conductive contact with the hollow body 43 having a cooling material 44 therein. Preferably, the body 43 is insulated from ambient air by insulation means 45. By a suitable choice of materials, a steady or constant temperature may be maintained such that sufficient heat may be secured within the material 44 for heating or cooling an element. The heat in the material may flow via the semiconductor elements 46 back to heat conducting element 41 when the current in the element is interrupted or the polarity is changed.

Figure 5:
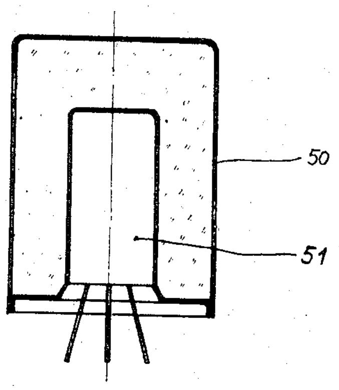
FIG. 5 is a side sectional view of a transistor cooled by a device according to the invention.

FIG. 5 illustrates a transistor 51 in which a cap 50 together with a flange of the transistor forms an annular space or hermetically sealed chamber which is filled with a cooling material.

Figure 6:
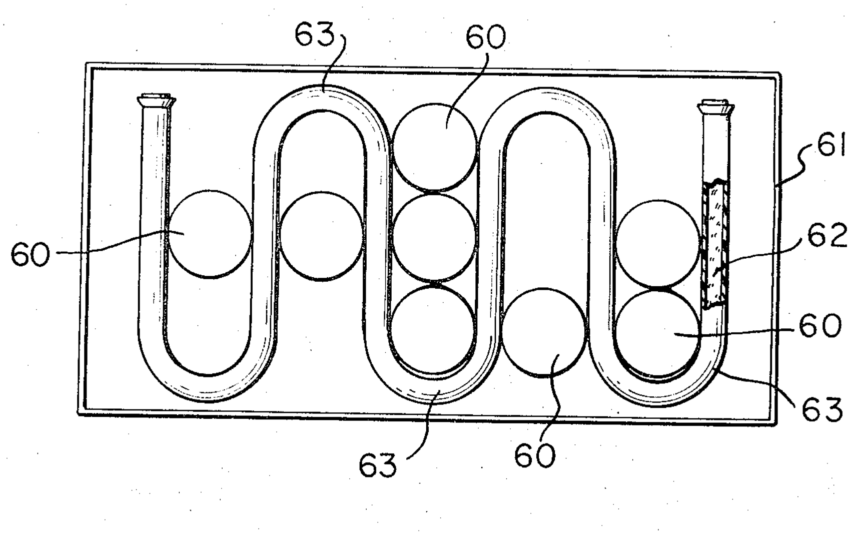
FIG. 6 is a top view partially in section illustrating a cooling device according to the invention wherein a cooling substance is arranged in hermetically sealed thin tubes.

FIG. 6 illustrates a plurality of semiconductors 60 mounted upon an extruded plate 61 where the semiconductors are cooled by a cooling material 62 which is hermetically sealed in a thin tube 63. This form of the invention is particularly applicable where the cooling material may comprise salts which would have a corrosive effect on metals. In the form of FIG. 6, the thin tube 63 may be made of a polyethylene or polypropylene which would not be affected by the salts comprising the cooling material. The flexibility of the thin tubing assists in the insertion of the tubing into a preformed channel in the plate and allows the tubing to closely contact the various semiconductors.

Figure 7:
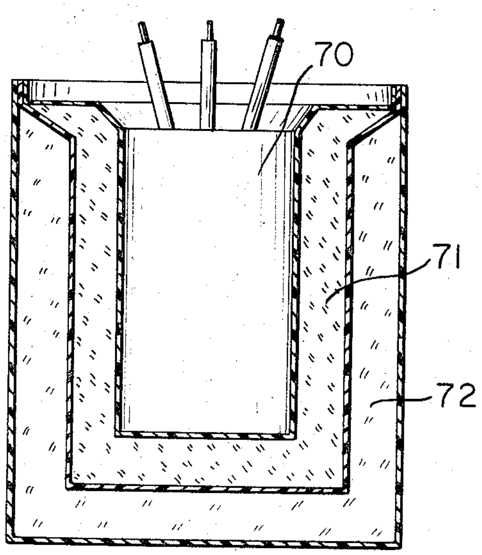
FIG. 7 is a side sectional view of a transistor cooled by two separate substances.

The invention also envisions the use of two cooling materials having different melting temperatures wherein each material is contained within a hermetically sealed chamber one within the other and where the outer chamber contains the material having the higher melting temperature. This form of the invention is shown in FIG. 7 which illustrates a transistor 70 cooled by two cooling materials 71 and 72 which have different melting temperature. The cooling material 71 experiences a phase change at the optimum operating temperature of the transistor and the cooling material 72 experiences a phase change at a temperature above that of the material 71, but below the temperature which would result in destruction of the transistor. The outer layer of the cooling material thus serves as a means to prevent destruction of the semiconductor element whereas the inner layer of the material serves to provide the normal cooling of the transistor.

I claim:

1. Apparatus for controlling the temperature of a semiconductor component during start up and operating conditions, said apparatus comprising a hermetically sealed chamber in thermal communication with a portion of said semiconductor component and a solid crystalline non-metallic material in said chamber where said material has a melting temperature within the desired operating temperature of said semiconductor component during start up and operating conditions and has a thermal conductivity less than that of a metal whereby said material during operation of said semiconductor may undergo a phase change from a solid to a liquid such that heat produced by said semiconductor is absorbed by said material during said phase change.

2. A cooling device according to claim 1 wherein the phase change enthalpy of said material is greater than 40 cal/g at the desired operating temperature of said semiconductor component.

3. Apparatus according to claim 2 wherein said material comprises a hydrate of a metal hydroxide.

4. Apparatus according to claim 1 having in addition a thickener mixed with said material whereby said material will remain in a gelled state at temperatures in excess of said melting temperature.

5. Apparatus according to claim 1 wherein said material comprises two substances each having different melting temperatures wherein one said substance has a melting temperature at the desired operating temperature of said semiconductor and the other said substance has a melting temperature which is below the maximum temperature to which the semiconductor component may be subjected without damage.

6. Apparatus according to claim 1 wherein said material is one that is capable of a polymorphous phase change at the desired operating temperature of said semiconductor component and which has a melting temperature slightly below that which is the maximum temperature the semiconductor component may be subjected without destruction.

7. Apparatus according to claim 1 wherein said semiconductor is in the form of a Peltier element having a heat emitting electrode and a heat absorbing electrode wherein said heat emitting electrode is in thermal conductive communication with said material and wherein said heat absorbing electrode is in thermal conductive communication with said portion of said component to be cooled.

8. Apparatus according to claim 1 having in addition a hollow body filled with said material with one end of said body communicating with the interior of said chamber whereby the material in the end of the hollow body furtherest away from said chamber remains in the solid phase during operation of said semiconductor component to act as a seeding material to said material in said chamber.

9. Apparatus according to claim 1 having in addition a plate containing hermetically sealed thin tubes therein wherein said tubes form said hermetically sealed chamber.

* * * * *